United States Patent

Oshiro et al.

[11] Patent Number: 6,073,746
[45] Date of Patent: *Jun. 13, 2000

[54] ASSEMBLED PART IN ASSEMBLY LINE

[75] Inventors: Akio Oshiro, Hamamatsu; Koji Niimi, Okazaki; Tomomi Nakamura, Hamamatsu; Ryousuke Sakamaki, Kosai; Masanori Oishi, Hamamatsu, all of Japan

[73] Assignee: Asmo Co., Ltd., Kosai, Japan

[ * ] Notice: Under 35 U.S.C. 154(b), the term of this patent shall be extended for 242 days.

[21] Appl. No.: 08/666,948

[22] Filed: Jun. 20, 1996

[30] Foreign Application Priority Data

Jul. 20, 1995 [JP] Japan .................................. 7-206480
Jan. 29, 1996 [JP] Japan .................................. 8-034407

[51] Int. Cl.[7] .................................................. B65G 47/00
[52] U.S. Cl. ...................................... 198/345.1; 198/741
[58] Field of Search ............................. 198/345.1, 345.3, 198/468.1, 741; 414/750

[56] References Cited

U.S. PATENT DOCUMENTS

| 4,170,284 | 10/1979 | Lachaussee | 198/345.1 |
| 5,293,680 | 3/1994 | Mizuta et al. | 198/345.1 |
| 5,579,885 | 12/1996 | Hollis et al. | 198/345.1 |

*Primary Examiner*—Joseph E. Valenza
*Attorney, Agent, or Firm*—Oblon, Spivak, McClelland, Maier & Neustadt, P.C.

[57] ABSTRACT

An assembled part for being placed on a conveyor frame having a pair of guides along a direction of conveyance, being located between an upstream delivery member and a downstream positioning member and being conveyed and guided through the movement of them as one body, which includes a main body, a pair of guided portions facing the guides, a delivered portion facing the delivery member, a positioned portion facing the positioning member.

25 Claims, 9 Drawing Sheets

FIG. I

ASSEMBLED PART IN ASSEMBLY LINE

BACKGROUND OF THE INVENTION

1. Field of the Invention

The invention relates to an assembled part in an automated assembly line.

2. Description of Related Art

In the automated assembly line, it is known that parts are conveyed to a location where they are assembled into or onto other members. The prior art directed the parts to their proper position through a pair of guides which are disposed parallel to each other. The parts are conveyed along the guides. To convey the parts in the automated assembly line, it is required that the outside of the parts meets the guides in shape. In other words, each of the parts must have its portion to be guided. Accordingly each of parts without a portion guided by the guides such as disc-like ones is conveyed on a pallet with a portion guided by the guides.

Such a pallet is expensive. Besides a plurality of pallets are required for a plurality of parts. Furthermore, many different types of such pallets must be provided for different shapes of the parts. Since the pallets add a weight toward the automated assembly line, the latter is naturally increased in scale. This greatly increased the manufacturing cost.

Previously used pallets should be changed to other ones when different shapes of parts are to be conveyed in the automated assembly line. This increases the number of working steps.

SUMMARY OF THE INVENTION

The object of the invention is to provide an assembled part which has a main body without its outside guided by guides, but does not require any pallet for conveying it in an assembly line.

Thus, the invention provides an assembled part for being placed on a conveyor frame having a pair of guides along a direction of conveyance, being located between an upstream delivery member and a downstream positioning member and being conveyed and guided through the movement of the delivery member and the positioning member as one body. The assembled part has a main body. A pair of guided portions face the guides. A delivered portion faces the delivery member. A positioned portion faces the positioning member.

According to the invention, the guided portions are guided by the guides and the assembled part is conveyed. Even if the main body of the assembled part does not have any face parallel to the guides, the assembled part can be conveyed on the conveyor frame without any pallet while being directed to its proper direction.

The main body preferably has a bottom face to be placed on the conveyor frame. Thus, the assembled part can smoothly be moved and conveyed on the conveyor frame.

The assembled part preferably comprises a pair of supporting portions which are spanned between the guides for supporting the main body. The supporting portions are spanned and supported between the pair of guides. The assembled part is thus conveyed on the conveyor frame while the supporting portions slides on the guides.

The assembled part preferably comprises an anti-rocking portion which touches at least one of the guides for preventing the rocking motion in the main body. Thus, the rocking motion can be prevented in the assembled part while being conveyed.

It is preferable that the distance between one of the guided portion guided by one of the guides and the other of the guided portion guided by the other of the guides is predetermined for the flexibility of designing the shape of the main body.

Thus, the distance between the pair of guided portions guided by the pair of guides is invariable even if the shape of the main body is variable. There is no need to change the distance between the guides depending on the types of assembled parts. This can reduce the number of working steps when the assembled parts are changed to other type of assembled parts.

It is preferable that the distance between the delivered and positioned portions is predetermined. Thus, the distance between the delivered and positioned portions is invariable even if the assembled parts are changed to other types of ones with different main bodies in shape. There is no need to change the delivery and positioning members and the distance therebetween. This can also reduce the installation cost and the number of working steps when the assembled parts are changed to other types of ones.

The assembled part preferably comprises a reference portion for a positioning standard. The distance between the reference portion and one of the guided portions is predetermined. Thus, the distance between the reference portion and one of the guided portion is invariable even if the assembled part is changed to another type of one with a main body different in shape. Therefore, the distance between the reference portion and one of the guides is also invariable. The position of the reference portion can be specified as an invariable position relative to one of the guides. When any other part is to be assembled into or onto the assembled part, the position of the reference portion is specified. This facilitates the automated assembly, for example, by the use of an assembling robot.

It is further preferable that the distance between the reference portion and either of the delivered portion and the positioned portion is predetermined.

Thus, the distance between the reference portion and either of the delivered portion and the positioned portion is invariable even if the main body is changed in shape. Therefore, the distance between the reference portion and either of the delivery member and the positioning member is also invariable. If the outside of the delivered or positioned portion is flat, the distance between that flat surface and the reference portion is invariable.

Since the position of the reference portion is specified in such a case, the automated assembly can be facilitated, for example, by the use of an assembling robot.

In other words, the position of the reference portion is specified to be spaced away from either of the delivery member and the positioning member by an invariable distance. When any other part is to be assembled into or onto the assembled part, the position of the reference portion is specified. This facilitates the automated assembly, for example, by the use of an assembling robot.

It is further preferable that the distance between the delivered portion and the reference portion is equal to the distance between the positioned portion and the reference portion. This also enables the position of the reference portion to be specified, resulting in facilitation of the automated assembly.

It is further preferable that the assembled part has a convexo-concave portion for discriminating the information inherent in the assembled part. The information about the assembled part can be automatically discriminated by the use of a convexo-concave portion part. Depending on the discriminated information, the assembly line can be coordinated. For example, the program used for an assembling robot can be automatically changed.

BRIEF DESCRIPTION OF THE DRAWINGS

The invention is described in detail with reference to the following drawings, wherein.

DETAILED DESCRIPTION OF THE PREFERRED EMBODIMENTS

Preferred embodiments of the invention are described in detail with reference to the drawings.
First Embodiment FIG. 1 is a schematic view showing an assembly line on which assembled parts 10 move.

Figure 3:
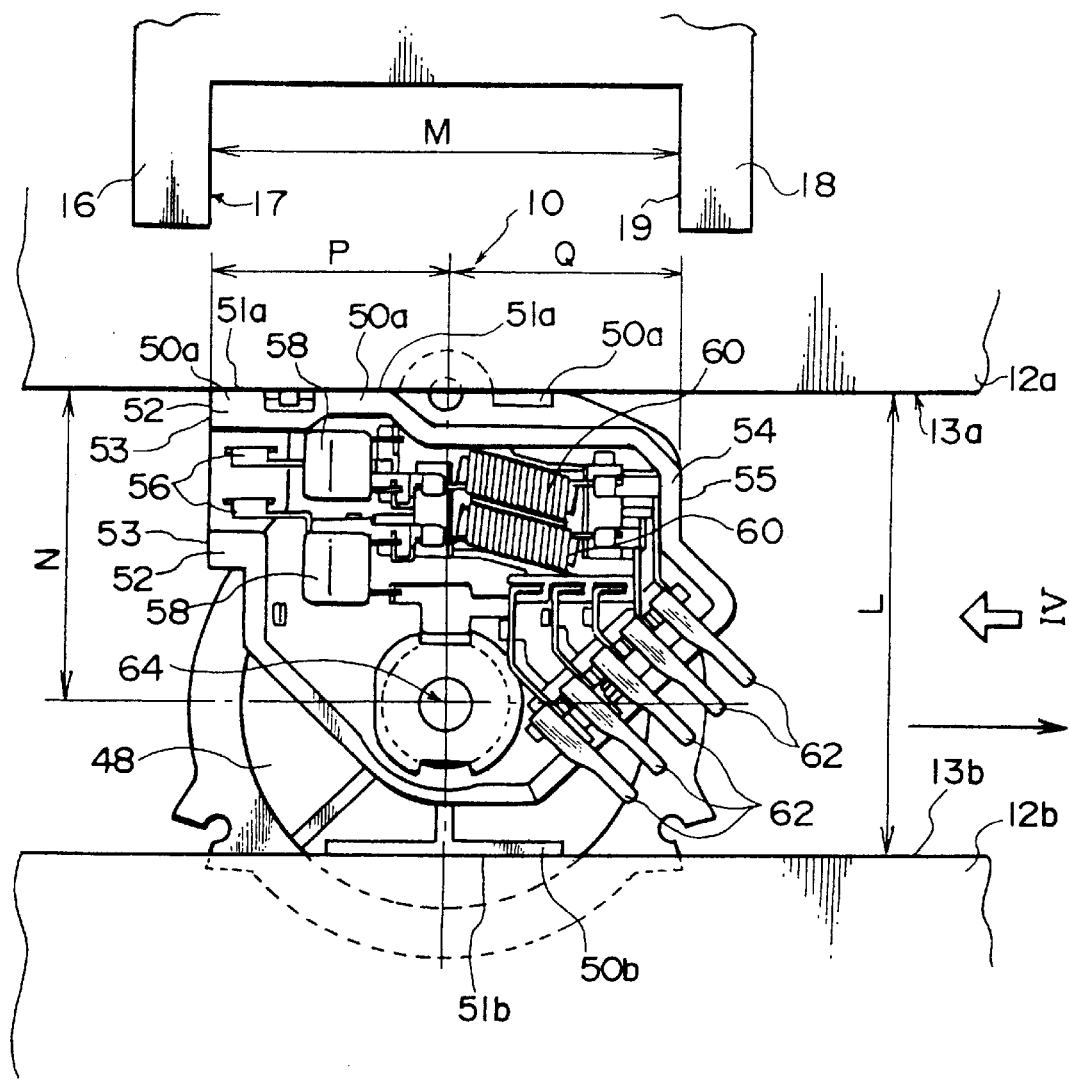
FIG. 3 is a plan view showing the assembled part shown in FIG. 1 and the conveying mechanism.

As shown in FIG. 3, each of the assembled parts 10 comprises a main body 48, guided portions 50a and 50b, a delivered portion 52 and a positioned portion 54.

The assembled parts 10 are guided by a pair of guides 12a and 12b disposed along the conveyance direction while being conveyed through the integral movement of an upstream delivery member 16 and a downstream positioning member 18 in the conveyance direction.

Figure 1:
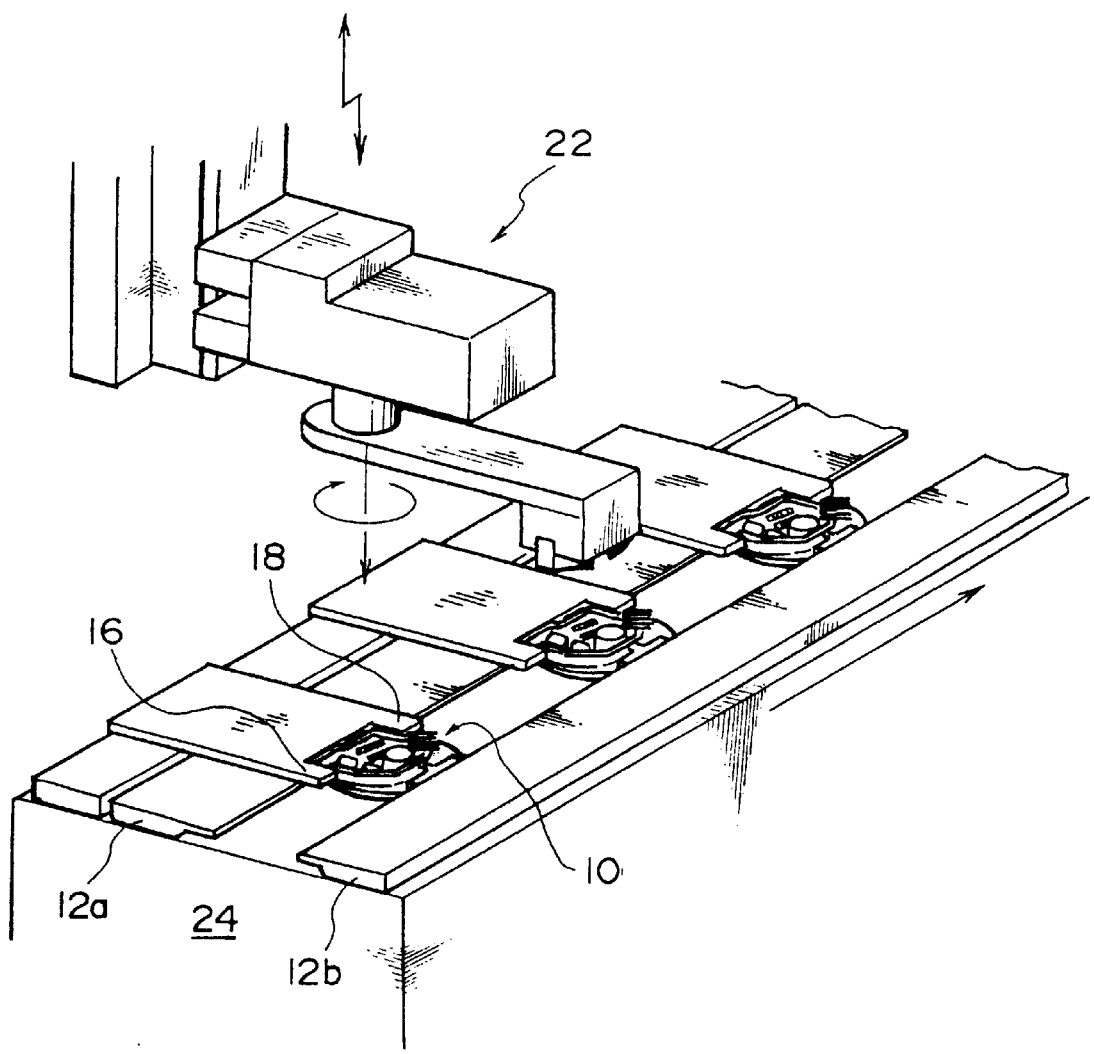
FIG. 1 is a schematic view of an assembly line in which assembled parts of a first embodiment of the invention move.

More particularly, each of the guides 12a or 12b has a guide face 13a or 13b, these guide faces being parallel to each other, as shown in FIGS. 1 and 3. The assembled parts 10 are guided on a conveyor frame 24 such that their proper direction in the plan view will not be changed. The assembled parts 10 slides step-by-step by a given distance along the guide face 13a, 13b through the interlocking movement between the delivery and positioning members 16, 18. The delivery member 16 provides a force to each of the assembled parts 10 such that it is pushed in the conveyance direction. The positioning member 18 functions to stop the pushed assembled part 10 at a given position. Some electric parts are assembled into each assembled part 10 through an assembling robot 22 or the like when it is stopped at the given position.

Figure 2:
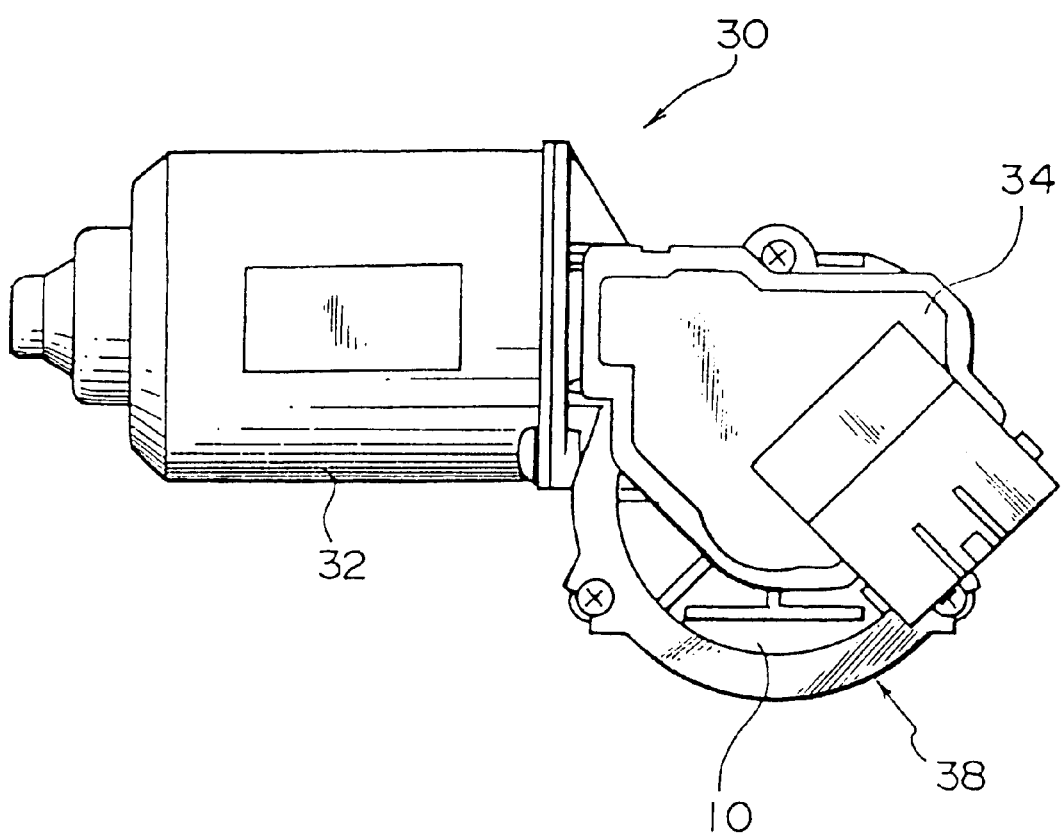
FIG. 2 is a view showing the appearance of a motor with reduction gear in which the assembled part as shown in FIG. 1 is used.

Each of the assembled parts 10 may be a gear cover used in such a motor 30 with reduction gear as shown in FIG. 2. Such a motor 30 with reduction gear may comprise a main motor body 32, a reduction gear 38 and a housing cover 34 in addition to the gear cover that is an assembled part 10. Some electric parts are assembled into the gear cover 10 before the parts of the motor 30 are assembled with the gear cover 10. This embodiment is characterized by the specific configuration of the gear cover 10 (assembled part 10) relating to the assembling step.

Figure 4:
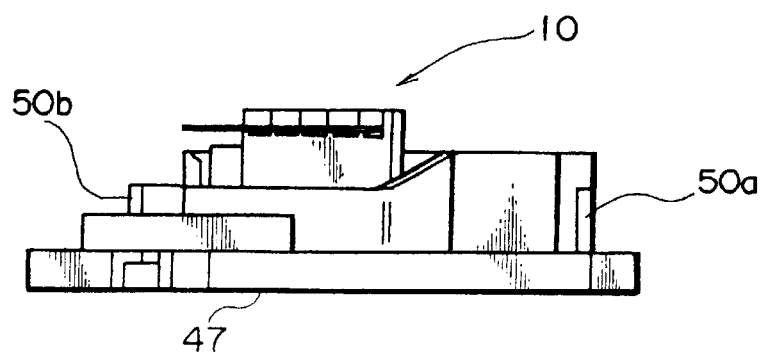
FIG. 4 is a side view as viewed from the direction IV in FIG. 3.

FIG. 3 is a plan view showing a conveying mechanism for conveying the assembled parts 10. FIG. 4 is a side view of one of the assembled parts 10 as viewed from the direction IV in FIG. 3. Although FIG. 3 shows the delivery and positioning members 16, 18 at positions offset from the assembled part 10 for convenience, the actual positions thereof are as shown in FIG. 1. More particularly, the delivery member 16 has an inner face 17 contacting the face 53 of the delivered portion 52 of the assembled part 10. The positioning member 18 has an inner face 19 contacting the face 55 of the positioned portion 54 of the assembled part 10.

In this embodiment, the inner faces 17 and 19 of the delivery and positioning members 16, 18 are shown to be flat. However, these inner faces 17 and 19 may take any surface configuration meeting the faces 53 and 55 of the delivered and positioned portions 52, 54.

As shown in FIG. 4, each of the assembled parts 10 has a bottom face 47 through which the assembled part 10 is to be placed on the conveyor frame 24. The guided, delivered and positioned portions (50a, 50b; 52 and 54) are formed of a plastic material and molded integrally on the main body 48. FIG. 3 further shows terminals 56, capacitors 58, choke coils 60, terminals 62 and other parts, all of which are assembled into the assembled part 10.

As shown in FIG. 3, the main body 48 of the assembled part 10 is of circular-shaped configuration in the plan view. Therefore, the main body 48 has no face parallel to the guide faces 13a and 13b of the guides 12a and 12b. Since the main body 48 of the assembled part 10 cannot be guided by the guides 12a and 12b, the assembled part 10 will not be conveyed on the conveyor frame 24 without rotation. According to the present invention, therefore, the main body 48 is provided with the guided portions 50a and 50b each of which is to contact the corresponding one of the guides 12a and 12b. The assembled part 10 can slide on the conveyor frame 24 while being maintained in its proper direction without rotation when the guided portions 50a and 50b thereof are guided by the pair of guides 12a and 12b. Furthermore, the main body 48 of the assembled part 10 can be smoothly conveyed on the conveyor frame 24.

In such an arrangement, the automation can be easily accomplished since the assembled parts 10 can be moved on the conveyor frame 24 without change of its proper direction. This can also improve the workability in the manual assembly.

The faces 53 and 55 of the delivered and positioned portions 52, 54 in the assembled part 10 are configured corresponding to the inner faces 17 and 19 of the delivery and positioning members 16, 18, as shown in FIG. 3. The assembled part 10 is held while the delivered and positioned portions 52, 54 are put into the delivery and positioning members 16, 18 with some clearance. Thus, the delivery member 16 of the assembled part 10 slides on the conveyor frame 24 along the pair of guides 12a and 12b in the conveyance direction. The positioning member 18 causes the assembled part 10 to stop at a given position.

It is preferred that even if the main body 48 of an assembled part 10 is changed in shape, the distance L between the faces 51a and 51b of the guided portions 50a and 50b (see FIG. 3) is invariable. Even though the assembled parts 10 having their main bodies 48 different in shape from one another are moved along the assembly line, it is not required to change the distance between the guides 12a and 12b. This means that the number of working steps can be reduced since the design of the guides 12a and 12b is not required to be changed.

The distance M between the delivery member 16 and the positioning member 18 (see FIG. 3) is designed such that they can be put into the delivered and positioned portions 52, 54 with some clearance. Thus, it is not required to change the shapes of the delivery and positioning members 16, 18 and/or the distance M therebetween even if the assembled parts 10 having their main bodies 48 different in shape from one another are moved along the assembly line. This also means that the increased installation cost and/or the increased number of working steps associated with the change in design can be avoided.

The main body 48 of the assembled part 10 has a reference portion 64. It is preferable that the distance between the reference portion 64 and either the face 51a or 51b in one of the guided portion 50a or 50b is predetermined irrespectively of the shape of the main body 48. For example, FIG. 3 shows a preset distance N between the reference portion 64 and the face 51a of the guided portion 50a. Even if the shape of the main body 48 is changed, therefore, the distance between the reference portion 64 and either the face 51a or 51b in one of the guided portion 50a or 50b becomes invariable. Thus, the distance between the reference portion 64 and either the faces 13a or 13b of one of the guides 12a, 12b that respectively contact the faces 51a, 51b is also invariable. Consequently, the position of the reference portion 64 can be specified to be respectively spaced away from either the faces 13a or 13b of one of the guides 12a and 12b by an invariable value. This can also specify the position where some parts are assembled into an assembled part 10, depending on the positional relationship with the reference portion 64. As a result, the assembly can be easily accomplished through an automated machine such as the assembling robot 22.

It is further preferable that the distance P or Q between the reference portion 64 and the face 53 or 54 of either the delivered or positioned portion 52 or 54 (see FIG. 3) is a preset value irrespectively of the shape in the main body 48. Even if the shape of the main body 48 is different, thus, the position of the reference portion 64 can be specified to be spaced away from one of the delivery and positioning members 16, 18 by an invariable value. As a result, the automation can be facilitated.

It is further preferable that the distances P and Q between the reference portion 64 and the faces 53 or 55 of either the delivered or positioned portions 52 or 54 are preset. This can also facilitate the automation.

Second Embodiment

Figure 5:
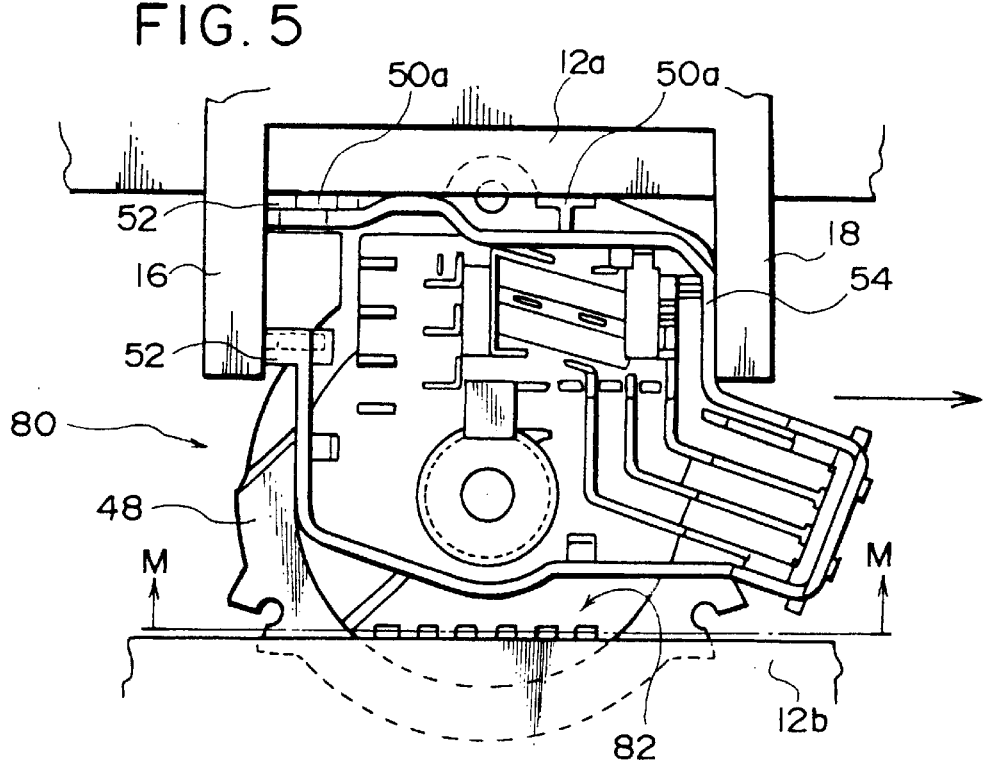
FIG. 5 shows an assembled part of a second embodiment of the invention.

FIG. 5 is a view showing an assembled part 80 which is a gear cover according to the second embodiment of the invention. In this figure, components similar to those of FIG. 3 are accompanied by similar reference numerals and will not further be described herein.

Figure 6A:
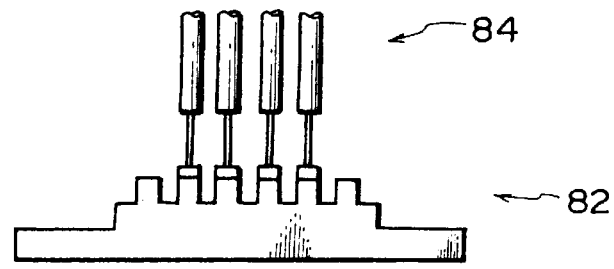
FIG. 6A shows a convexo-concave portion to which a height sensor is applied and FIG. 6B shows a modified embodiment thereof.
Figure 6B:
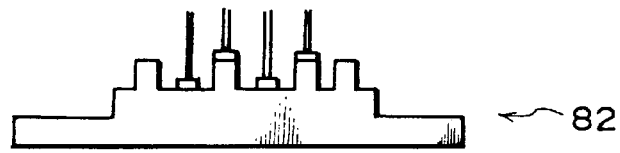

The assembled part 80 is characterized by a convexo-concave portion 82 that is provided on the guided portion 50b. FIG. 6A shows that a height sensor 84 is applied to the convexo-concave portion 82 while FIG. 6B shows a modified form. By provision of the convexo-concave portion 82, a binary coding system can be used, for example, by setting a concave at "0" and a convex at "1". Thus, information such as the type of the assembled part 80 can be transmitted to a control unit. Such a coding system is not limited to two states such as concave and convex in the convexo-concave portion 82, but may be applied to three or more states.

Figure 7:
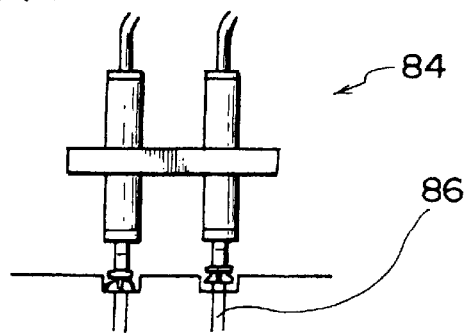
FIG. 7 shows how to use the height sensor.

The convexo-concave portion 82 is not necessarily provided on the guided portion 50b, but may be formed on any other portion of the assembled part 80. FIG. 7 shows that the height sensor 84 functions to sense the height of a screw 86.

In the second embodiment, the assembled part 80 may not only be gear cover but also a brush holder or the like.

Third Embodiment

The third embodiment will be described in connection with another assembled part to which the invention is applied.

Figure 8A:
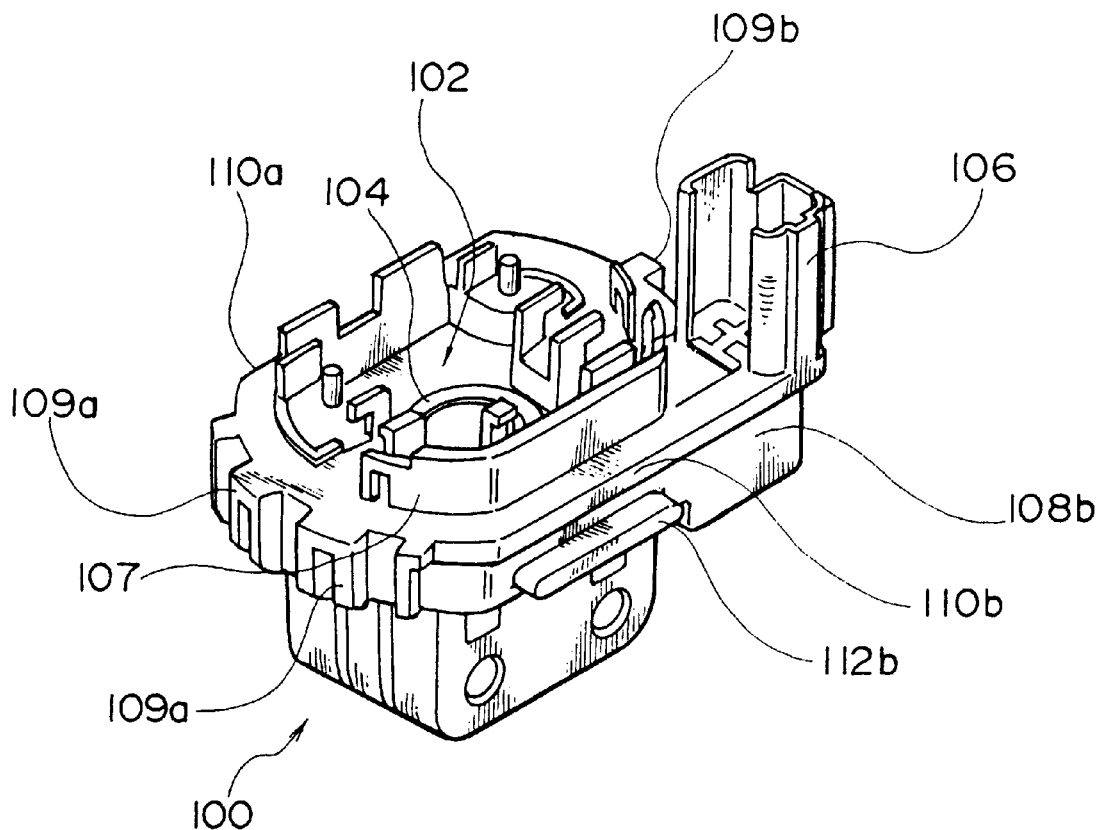
FIG. 8A is a perspective view showing an assembled part of a third embodiment of the invention and FIG. 8B is a side view thereof.
Figure 8B:
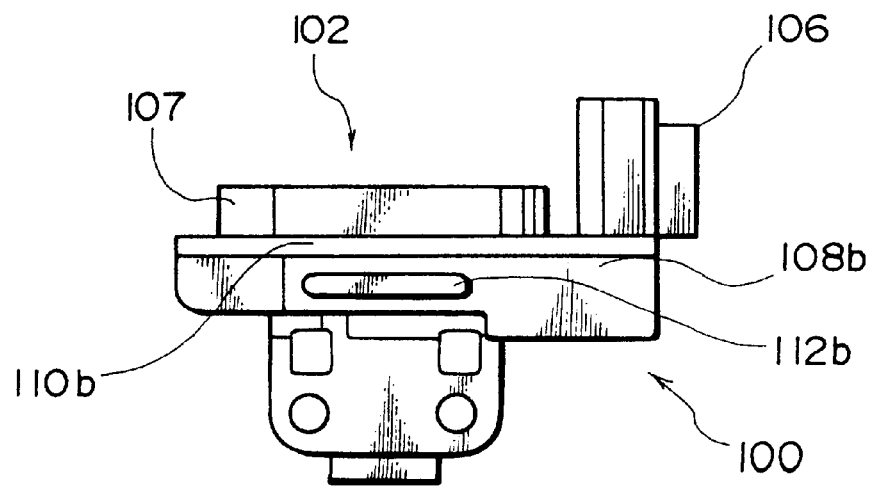
Figure 9:
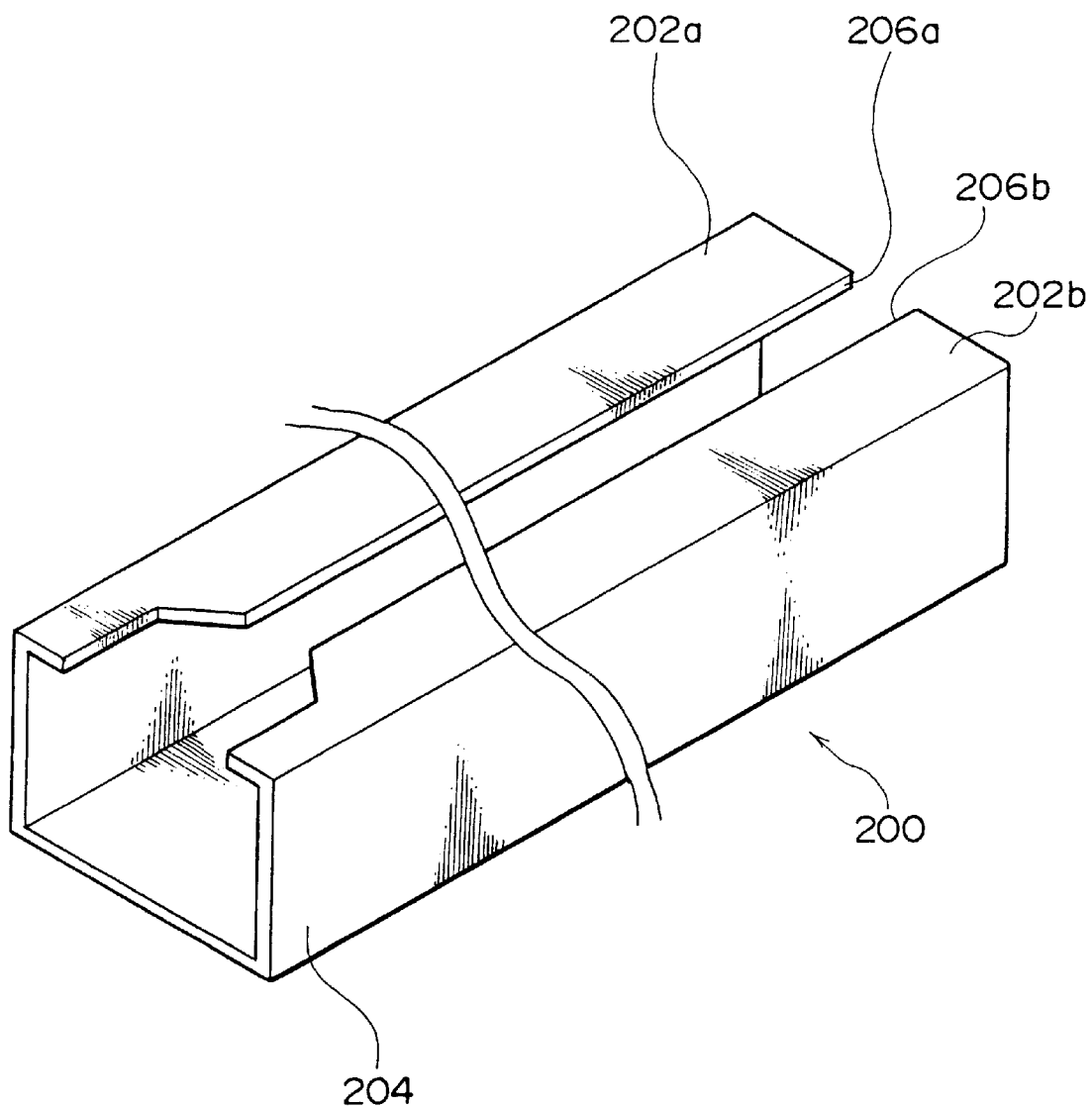
FIG. 9 is a perspective view of a conveying member used to convey the assembled part shown in FIGS. 8A and 8B.
Figure 10:
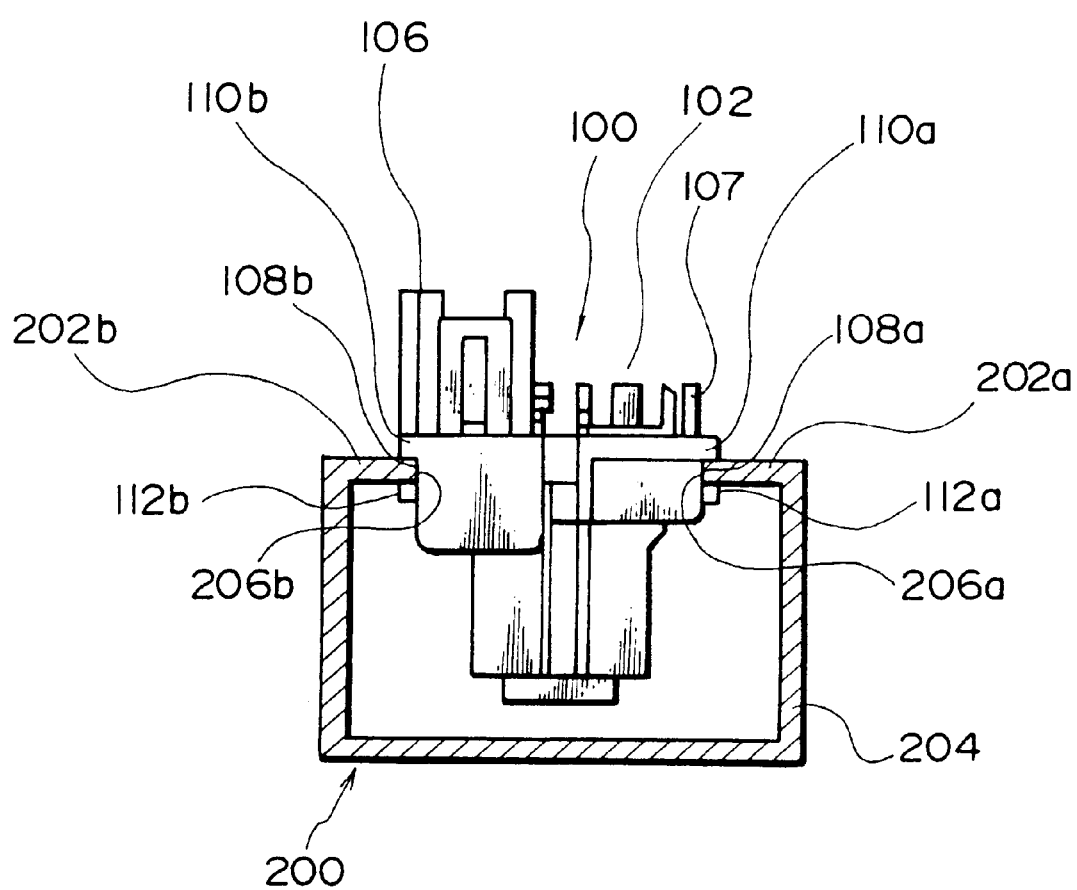
FIG. 10 shows assembled part of FIGS. 8A and 8B placed on the conveying member as viewed in the conveyance direction.

FIGS. 8A and 8B are a perspective and right side views showing an assembled part according to the third embodiment. FIG. 9 is a perspective view showing a conveying member used to convey the assembled part. FIG. 10 shows the assembled part mounted on the conveying member as viewed in the conveyance direction.

FIGS. 8A and 8B show an assembled part 100 which is a casing for DC motor. The assembled part 100 has an opening 102 into which some parts such as brush, electrode, thermistor or the like are to be assembled, a bearing holder 104 into which the bearing member of a rotor is to be assembled, a connector portion 106 on which a connector for supplying a current to the brush is to be mounted, and a fitting wall portion 107 which is to be fitted into a stator frame (not shown).

The conveying member 200 shown in FIG. 9 includes a pair of flat plate-shaped guides 202a and 202b that extend in the conveyance direction and spaced parallel away from each other. Each of the guides 202a and 202b is supported by a guide supporting portion 204 of inverse C-shaped cross-section.

As shown in FIG. 10, the assembled part 100 is conveyed on the conveying member 200 with the opening 102 being upwardly directed. Some parts will be automatically or manually assembled into the opening 102. At this time, the assembled part 100 will be disposed between the delivery and positioning members (not shown) like the above mentioned embodiments and conveyed while being guided through the integral movement of the delivery and positioning members. The fitting wall portion 107 and both opposite ends 109a, 109b of the assembled part 100 are utilized as the delivered and positioned portions for being put into the delivery and positioning members.

The assembled part 100 is provided with guided portions 108a and 108b touching the guides 202a and 202b, supporting portions 110a and 110b, and anti-rocking portions 112a and 112b in order to convey the assembled part 100 while maintaining its proper direction without use of any pallet.

The guided portions 108a is formed to face the end face 206a of the guides 202a while the guided portions 108b is formed to face the end face 206b of the guides 202b. Thus, the assembled part 100 can be maintained in its proper direction when it is conveyed in the conveyance direction.

The supporting portion 110a is formed above the guided portion 108a such that it can contact the top face of the guide 202a. Similarly, the supporting portion 110b is formed above the guided portion 108b such that it can contact the top face of the guide 202b. Thus, the assembled part is supported between the guides 202a and 202b of the conveying member 200.

The anti-rocking portions 112a and 112b function to prevent the assembled part 100 from being rocked on the conveying member 200. The assembled part 100 may be rocked on the conveying member 200 when some parts are to be assembled into the opening 102 of the assembled part 100. In such a case, the parts may not be properly assembled into the assembled part 100. To overcome such a problem, the assembled part 100 has an anti-rocking portion 112a below the guided portion 108a. Similarly, the assembled part 100 has an anti-rocking portion 112b below the guided portion 108b. Thus, any rocking action in the assembled parts 100 can be prevented when the anti-rocking portions 112a and 112b touch the underside of each of the guides 202a and 202b.

In such a manner, the assembled part 100 can be properly conveyed on the conveyor frame without use of any pallet. Particularly, the assembled part 100 is provided with the supporting portions 110a, 110b and the anti-rocking portions 112a, 112b. Therefore, the assembled part 100 can be properly conveyed on the conveyor frame without any rocking action even if the assembled part 100 does not have any flat bottom face for sliding movement on the conveyor frame.

Figure 11:
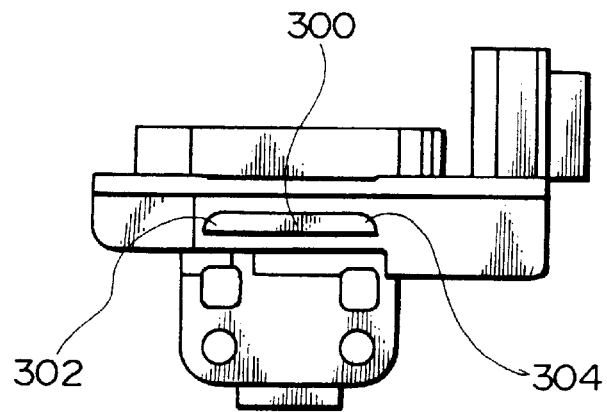
FIG. 11 shows a modified embodiment of the assembled part.
Figure 12:
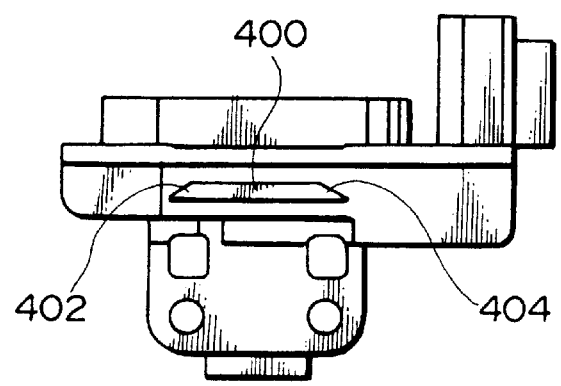
FIG. 12 shows another modified embodiment of the assembled part.

It is to be understood that the invention may be applied to any one of various different forms. Each of the anti-rocking portions 112a and 112b is formed to have its opposite rounded ends by a certain curvature for engaging with the conveying member 200 (see FIGS. 8A and 8B). However, any other form as shown in FIG. 11 or 12 may be adopted. More particularly, as shown in FIG. 11, an anti-rocking portion 300 may have the opposite ends 302 and 304 rounded on their sides that contact the guides 202a and 202b of the conveying member 200, respectively. Thus, the sliding movement of the assembled part relative to the guides 202a and 202b can be further smoothed. As shown in FIG. 12, the opposite ends 402 and 404 of an anti-rocking portion 400 may be tapered. This can also smooth the sliding movement of the assembled part 100 relative to the guides 202a and 202b.

Figure 13:
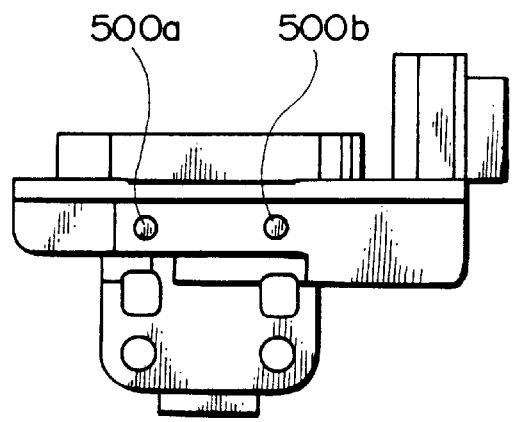
FIG. 13 shows a further modified embodiment of the assembled part.

If two projection-shaped anti-rocking portions 500a and 500b are formed spaced away from each other by a given distance as shown in FIG. 13, the aforementioned function and advantage can be similarly provided. The similar effect may be obtained in the case where the anti-rocking portion 112a, 112b, 300, 400, 500a or 500b is only formed in the assembled part on one side.

Figure 14:
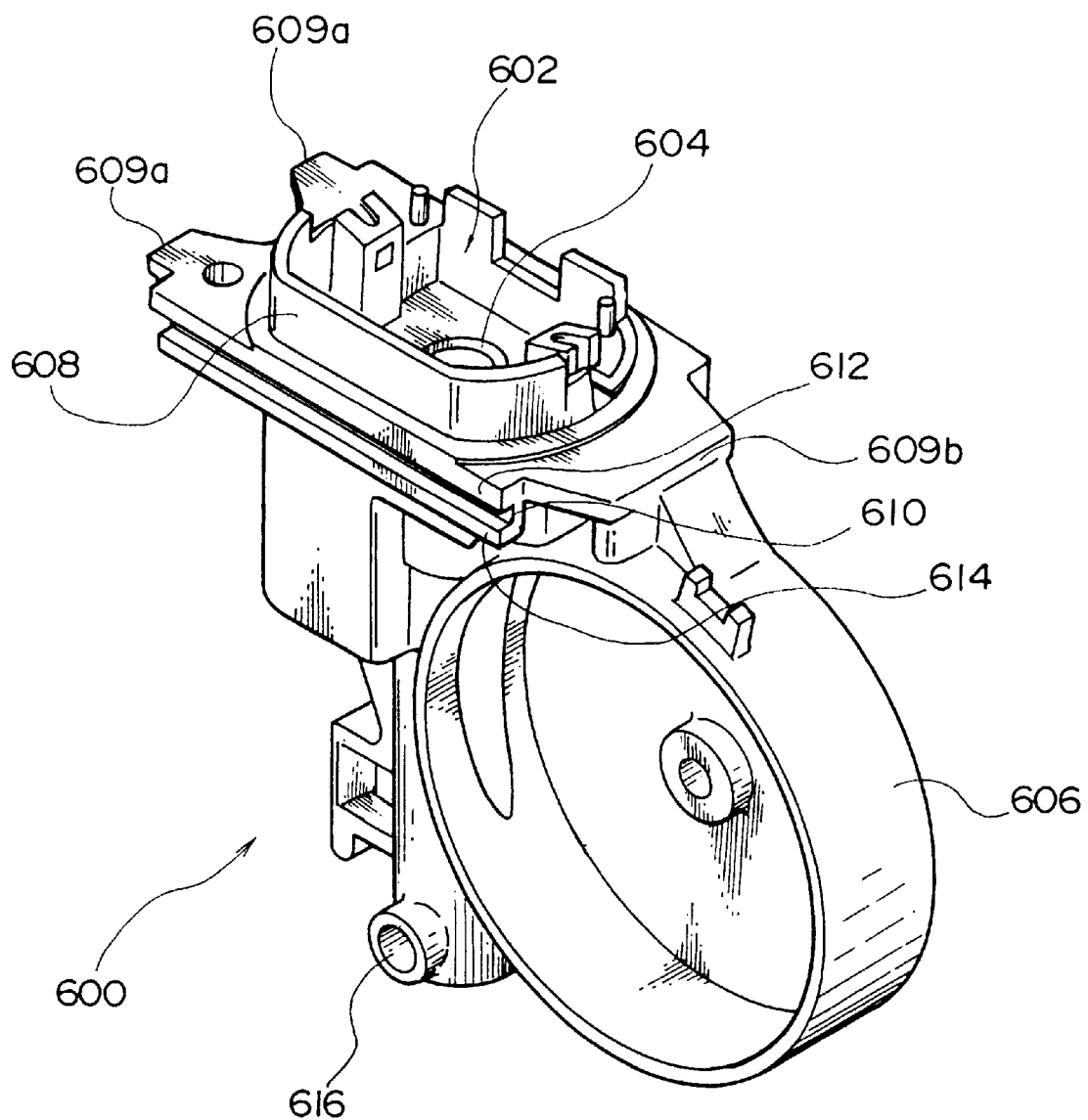
FIG. 14 is a perspective view showing a further modified embodiment of the assembled part.

FIG. 14 is a perspective view showing a further modified form of the assembled part 100. An assembled part 600 shown in FIG. 14 is provided with an opening 602 into which some parts such as brush, electrode, thermistor, capacitor or the like are to be assembled. The assembled part 600 also comprises a bearing portion 604 and a gear cover 606 into which reduction gears including a worm gear or the like are to be assembled. The assembled part 600 further comprises a fitting wall portion 608 which is to be fitted into a stator frame (not shown) and functions as a delivered/ positioned portion. Furthermore, both the opposite ends 609a and 609b of the assembled part 600 can also be used as delivered and positioned portions.

The opening 602 includes guided portions 610 formed thereon at the opposite sides, which are adapted to engage with and slide on the guides 202a and 202b (see FIG. 9). The assembled part 600 has a supporting portion 612 above each of the guided portions 610. The supporting portion 612 slides on the upper face of the guides 202a, 202b and supports the assembled part 600. The assembled part 600 has an anti-rocking portion 614 below each of the guided portions 610. The anti-rocking portion 614 touches the bottom face of the guides 202a, 202b and prevents the assembled parts 600 from being rocked. The guided portion 610, the supporting portion 612 and anti-rocking portion 614 take the shape of an inverse C-shaped cross-section to engage with the end of the corresponding guides 202a or 202b.

The bottom of the assembled part 600 is provided with a positioned hole 616. When a positioning pin (not shown) is inserted into the positioned hole 616 from the side of the conveyor frame, some electric parts can be assembled into the opening 602 with an improved accuracy.

What is claimed is:

1. A combination of an assembled part and a conveyor, said conveyor including a frame having a pair of opposed symmetrically located guides establishing a direction of conveyance, an upstream delivery member spaced apart from a downstream positioning member in said direction so as to leave a gap between said members, and a mechanism for moving said members in said direction with said assembled part being configured to be conveyed without rotation and guided through the movement of said delivery member and said positioning member as one body along said direction, said assembled part comprising:

a main body;

a pair of guided portions on opposite sides of the main body, each guided portion being provided with a predetermined configuration to engage a different one of said guides;

a delivered portion on the main body and positioned facing said delivery member and configured to engage said delivery member; and a positioned portion on the main body and positioned facing said positioning member and configured to engage said positioning member.

2. The combination of claim 1, wherein the distance between one of said guided portions guided by one of said guides and the other of said guided portions guided by the other of said guides is predetermined for the flexibility of designing the shape of said main body.

3. The combination of claim 1, further comprising a pair of supporting portions being spanned between said guides for supporting said main body.

4. The combination of claim 3, further comprising an anti-rocking portion touching at least one of said guides for preventing the rocking motion in said main body.

5. The combination of claim 3, wherein the distance between one of said guided portions guided by one of said guides and the other of said guided portions guided by the other of said guides is predetermined for the flexibility of designing the shape of said main body.

6. The combination of claim 4, wherein the distance between one of said guided portions guided by one of said guides and the other of said guided portions guided by the other of said guides is predetermined for the flexibility of designing the shape of said main body.

7. The combination of claim 2, wherein the distance between said delivered portion and said positioned portion is predetermined.

8. The combination of claim 5, wherein the distance between said delivered portion and said positioned portion is predetermined.

9. The combination of claim 6, wherein the distance between said delivered portion and said positioned portion is predetermined.

10. The combination of claim 2, further comprising a reference portion for a positioning standard, the distance between said reference portion and one of said guided portions being predetermined.

11. The combination of claim 7, further comprising a reference portion for a positioning standard, the distance between said reference portion and one of said guided portions being predetermined.

12. The combination of claim 8, further comprising a reference portion for a positioning standard, the distance between said reference portion and one of said guided portions being predetermined.

13. The combination of claim 9, further comprising a reference portion for a positioning standard, the distance between said reference portion and one of said guided portions being predetermined.

14. The combination of claim 10, wherein the distance between said reference portion and either of said delivered portion and said positioned portion is predetermined.

15. The combination of claim 11, wherein the distance between said reference portion and either of said delivered portion and said positioned portion is predetermined.

16. The combination of claim 12, wherein the distance between said reference portion and either of said delivered portion and said positioned portion is predetermined.

17. The combination of claim 13, wherein the distance between said reference portion and either of said delivered portion and said positioned portion is predetermined.

18. The combination of claim 14, wherein the distance between said delivered portion and said reference portion is equal to the distance between said positioned portion and said reference portion.

19. The combination of claim 15, wherein the distance between said delivered portion and said reference portion is equal to the distance between said positioned portion and said reference portion.

20. The combination of claim 16, wherein the distance between said delivered portion and said reference portion is equal to the distance between said positioned portion and said reference portion.

21. The combination of claim 17, wherein the distance between said delivered portion and said reference portion is equal to the distance between said positioned portion and said reference portion.

22. The combination of claim 18, further comprising a convexo-concave portion for discriminating the information inherent in said main body.

23. The combination of claim 19, further comprising a convexo-concave portion for discriminating the information inherent in said main body.

24. The combination of claim 20, further comprising a convexo-concave portion for discriminating the information inherent in said main body.

25. The combination of claim 21, further comprising a convexo-concave portion for discriminating the information inherent in said main body.

* * * * *